United States Patent [19]

McDonald

[11] 4,425,945
[45] Jan. 17, 1984

[54] THREAD GUARD

[76] Inventor: Ronald T. McDonald, 410 Santa Dominga, Solana Beach, Calif. 92075

[21] Appl. No.: 426,621

[22] Filed: Sep. 29, 1982

[51] Int. Cl.³ .............................................. B65D 59/06
[52] U.S. Cl. .................................................. 138/96 T
[58] Field of Search ................. 138/89, 96 R, 96 T, 138/110

[56] References Cited

U.S. PATENT DOCUMENTS

| | | | |
|---|---|---|---|
| 2,251,897 | 8/1941 | Severn | 138/96 T |
| 2,316,013 | 4/1943 | Mulholland | 138/96 T |
| 2,523,930 | 9/1950 | Unke | 138/96 T |
| 2,701,584 | 2/1955 | Philips | 138/96 T |
| 2,709,456 | 5/1955 | Hillix | 138/96 T |
| 3,000,402 | 9/1961 | Bowman | 138/96 T |

Primary Examiner—John W. Shepperd
Attorney, Agent, or Firm—Brown & Martin

[57] ABSTRACT

A protective cap for threaded pipe includes a tubular housing closed at one end and open at the other for fitting over the threaded end of a pipe with a tubular lining within the housing of a mesh flexible material biased at the closed end into engagement with the threads by means of an annular resilient band and partially biased at the open end into engagement with the pipe by means of a semicircular strip of resilient material.

11 Claims, 5 Drawing Figures

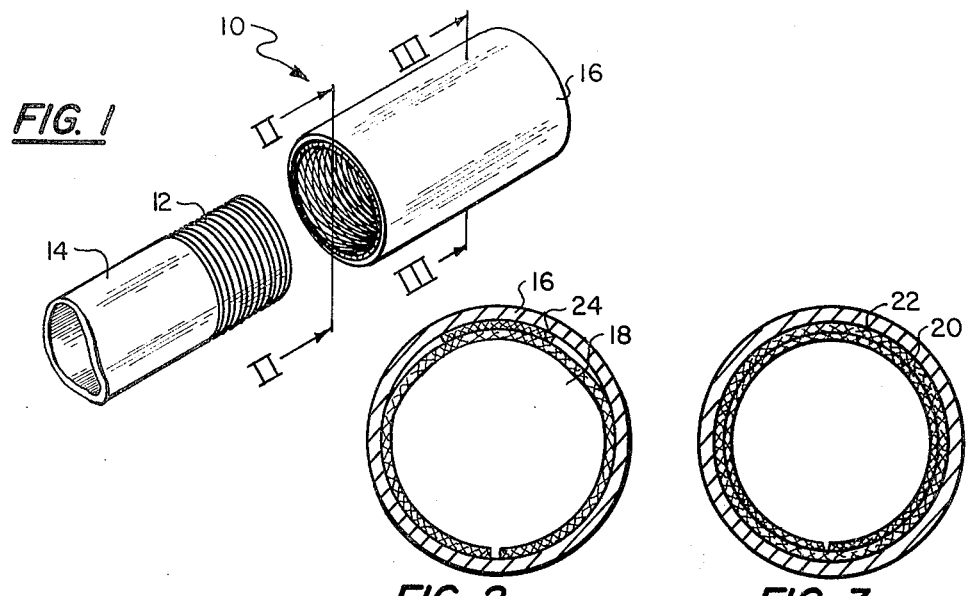
FIG. 1
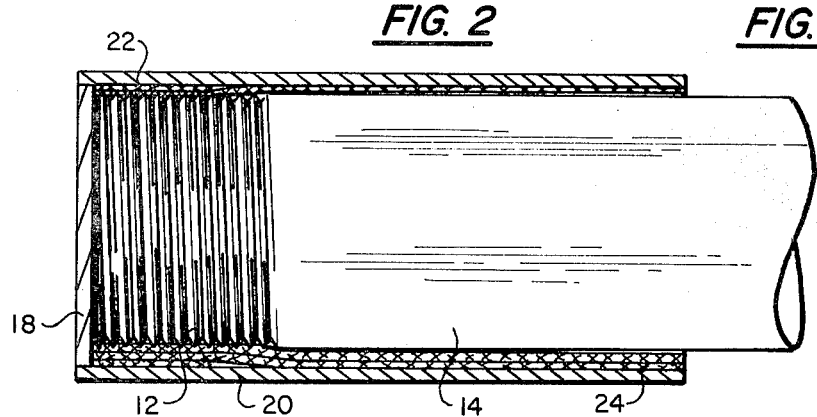
FIG. 2    FIG. 3
FIG. 4
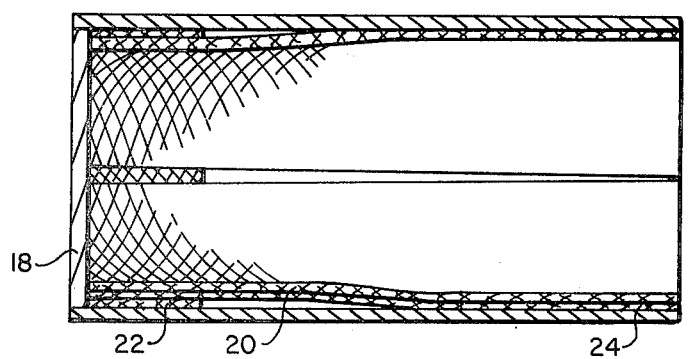
FIG. 5

THREAD GUARD

BACKGROUND OF THE INVENTION

The present invention relates to protective covers and pertains particularly to a protective cap or guard for threaded pipe and tubing.

Threaded pipe and tubing generally requires a protective cover over the threaded ends to prevent damage to the threads during handling and shipping. This is particularly critical for precision pipe fitting and tubing such as that utilized for oil field use.

Various protective covers and caps are available for use on pipes and tubings. Those caps and protective covers presently available, however, are not satisfactory for preshipment handling during the manufacturing and testing process. Such caps that are currently available are either threaded onto the pipe and require threaded removal or in the alternative require at least threaded removal. Such removal by unscrewing the cap from the threads is time consuming and adds considerably to the costs of production because of the delays which it causes in the production line.

Oil well tubing and casing in the form of seamless pipe must be accurately manufactured. The manufacturing, threading, gauging and inspection of such casing and tubing is rigidly controlled by the American Petroleum Institute. In high speed tubing and casing manufacturing, the steel pipe rolls down a production line and a pipe is threaded every twenty seconds. Hourly employees stand at the threader and inspect every fifth pipe for quality control. So few are checked as there is little time and also because of the precise capabilities of the threading machine which rarely produces a quality control problem.

After the threading is completed, the pipes roll into a cradle for removal into a high pressure testing area. At the high pressure testing area, the pipe is again placed on a gently tilted runout table that tilts toward the tester. At the tester, steel couplers are threaded onto the pipe and the pipe is subjected to 10,000 psi of water pressure to check the integrity of the pipe and the threaded ends. After completion of the threading operation, up to 2% losses are usually suffered primarily because of thread damage. While the pipe can usually be rethreaded once, it is scrapped if damage occurs more than once. The damage usually occurs in the handling of the pipe. The drop from the runout table and the storage area are major contributors to the thread damage.

Other damage occurs as a result of tubing lengths. Oil tubing is upset and has a plug collar which is actually larger than the tubing itself. Any misalignment in the stacks of the tubing or different lengths result in the plug collars of one pipe engaging and damaging the threads on the adjacent pipe.

One major consideration in solving this problem is the time factor in installing and removing the thread protective caps or guards. Threaded protectors that are available in the form of threaded sleeves reduces the production rate by nearly 50%, so that the cure is actually more expensive than the damage problem itself.

It is therefore desirable that an improved thread guard or protective cap be available.

SUMMARY AND OBJECTS OF THE INVENTION

It is therefore the primary object of the present invention to provide an improved thread guard.

In accordance with the primary aspect of the present invention, a quickly attachable and detachable thread guard comprises a tubular housing closed at one end and provided with a flexible liner that is biased by resilient means into close fitting engagement with the threads or other portions of the pipe to retain the thread guard into position on the pipe and to shield the threads from damage.

BRIEF DESCRIPTION OF THE DRAWINGS

The above and other objects and advantages of the present invention will become apparent from the following description when read in conjunction with the drawings wherein:

FIG. 1 is a perspective view of a preferred embodiment of the invention positioned to fit on the end of a threaded pipe;

FIG. 2 is an end view taken generally on line II—II of FIG. 1;

FIG. 3 is a section view taken generally on line III—III of FIG. 1;

FIG. 4 is a side elevation view in section showing the cap or guard on a pipe;

FIG. 5 is a side elevation view in section showing details of the interior of the guard.

DETAILED DESCRIPTION OF A PREFERRED EMBODIMENT

Referring to FIG. 1 of the drawings, a thread guard in accordance with the invention, designated generally by the numeral 10 is positioned to fit on the threaded end 12 of a pipe or tubing 14. The thread guard is constructed of a tubular sleeve or housing 16 open at one end and closed at the opposite end by means of a circular disk 18. The tubular housing itself is preferably constructed of a heavy-duty paper or cardboard sleeve with an end cap that may be either a heavy-duty cardboard, plastic or metal. The end cap may be omitted and other means provided to engage the end of the pipe and prevent the sleeve from sliding beyond the end of the pipe. The thread guard is intended primarily to be a temporary guard for use in the manufacturing plant until the tubing or pipe is or has received final approval and is ready for shipping.

The tubular housing is preferably slightly larger in diameter than the pipe which it is intended to fit and is provided with an inner sleeve 20 which is designed to extend the entire length of the housing and to engage the threads and/or the plug collar or at least a portion of the pipe. The sleeve 20 in the preferred form is an open mesh plastic or rubber material, preferably of a high impact plastic that is somewhat slick to allow the pipe to slide easily on the full length of the tube.

A first biasing ring or sleeve 22 fits adjacent the closed end and supports the inner sleeve 20 and biases it against the threaded end of the pipe. The resilient collar 22 may be of any suitable plastic or rubber material that is soft and pliable with a large coefficient of expansion to enable the inner sleeve 20 to expand and tightly engage the threaded end or the plug collar portion of the pipe. The engagement of the pipe is preferably of such force to provide sufficient frictional force as to retain the sleeve in place on the end of the pipe. Thus, the liner at the closed end of the cap is permitted to expand by the resilient ring 22 over the threaded end of the pipe.

The open end of the pipe is provided with a similar biasing strip that may be either a thinner, completely circular strip or, as in the illustrated embodiment, a linear strip or element 24 of the same material as the ring 22 that extends along the housing from overlapping the ring 22 up to at least past the plug collar. For production purposes utilizing the same material and utilizing a strip is preferred. The strip 24 provides an inlet diameter of the cap that is reduced by much less than the reduction in diameter at the closed end that result from the ring or sleeve 22. Other arrangements of biasing material between the liner 20 and the housing 16 are possible that will provide an arrangement for frictionally gripping the end of the pipe.

The members 22 and 24 may be made of a solid resilient material, a foam material, or an open mesh material similar in structural configuration of that of the preferred innerliner 20. In the preferred construction, the biasing or resilient members 22 and 24 may be bonded directly to the inside of the tubular housing 16. The innerliner 20 may also be bonded in place by a small portion of cement or the like.

The sleeve 20, in addition, is preferably split at least partially along the length such that at least at the inner end or closed end it is permitted to expand or contract to fit the end of the pipe. Preferably the split is in the form of a narrow V-groove, as illustrated in FIG. 5. This permits the portion of the liner 20 at the closed end of the tube to expand and contract to a greater extent than at the open end to permit it to fit over the threads and/or plug collar of a threaded pipe or tubing. High pressure oil field tubing of the type having an enlarged plug collar is easily accommodated by the thread guard is usable on straight pipe as illustrated in FIG. 4.

The thread guard of the present invention provides a quick fitting, frictional fit, which will accommodate the permissible variations in tubing and casing sizes. Tubing is permitted to vary up to ±0.031 inches OD and casing varies ±0.075% of the OD. The construction as illustrated, provides for fitting over the collar of the tubing providing a friction fit on one or the other or both of the threads and the tubing. The thread guard can be quickly and easily removed by hand simply by pulling it off the end of the pipe or tubing when plant handling has been completed and the tubing is ready for preparation to be shipped. The thread guards can be removed without unthreading simply by grasping and pulling axially off the end of the tubing.

While I have illustrated and described my invention by means of specific embodiments, it is to be understood that numerous changes and modifications may be made therein without departing from the spirit and scope of the invention as defined in the appended claims.

I claim:

1. A protective cap for threaded pipe comprising:
   a tubular housing having closed end and open end for fitting over threaded end of pipe;
   a tubular lining in said housing extend substantially the length thereof; and
   an elastic ring disposed between said liner and the wall of said tubular housing for biasing said liner into frictional gripping engagement with the end of a pipe.

2. The protective cap of claim 1 wherein: said tubular housing is high density paperboard.

3. The protective cap of claim 1 wherein liner is high density plastic.

4. The protective cap of claim 3 wherein the plastic is polyethylene.

5. The protective cap of claim 4 wherein the liner is open mesh.

6. The protective cap of claim 1 wherein said biasing means includes a strip of resilient material disposed between said line and said housing adjacent the open end thereof.

7. The protective cap of claim 1 wherein said housing is formed of a high density paperboard; and further comprises a high density plastic disc covering said closed end.

8. A protective cap for threaded pipe comprising:
   a tubular housing having closed end and open end for fitting over threaded end of pipe;
   an open mesh tubular lining of a high density polyethylene in said housing extending substantially the length thereof; and
   a resilient band having a high coefficient of expansion disposed between said housing and said liner for biasing said liner into frictional gripping engagement with the end of a pipe.

9. A protective cap for threaded pipe comprising:
   a tubular housing having closed end and open end for fitting over threaded end of pipe;
   a tubular lining of open mesh of a high density polyethylene in said housing extending substantially the length thereof;
   a resilient band disposed adjacent the closed end of said housing for biasing said liner into frictional gripping engagement with the end of a pipe, and
   further comprising a resilient strip having a high coefficient of expansion extending partially along said liner between the ends of said housing.

10. A protective cover for the threaded end of a pipe, said cover comprising:
    an open ended tubular high density paperboard housing having open end for fitting over threaded end of a pipe;
    a tubular lining of open mesh high density polyethylene mounted in said housing between the ends thereof; and
    an elastic ring disposed between said liner and the wall of said tubular housing disposed between said liner and the wall of said housing for biasing said liner into frictional gripping engagement with the threaded end of a pipe.

11. A protective cover for the threaded end of a pipe, said cover comprising:
    an open ended tubular high density paperboard housing having open end for fitting over threaded end of a pipe;
    a tubular lining of open mesh of high density polyethylene mounted in said housing between the ends thereof; and
    a strip of resilient material disposed between said liner and said housing adjacent the open end thereof for biasing said liner into frictional gripping engagement with the threaded end of a pipe.

* * * * *